US009360336B2

(12) United States Patent
Hoesterei (10) Patent No.: US 9,360,336 B2
(45) Date of Patent: Jun. 7, 2016

(54) NAVIGATION DEVICE HAVING A RANGE INDICATOR FOR AN ELECTRIC DRIVING OPERATION AND MOTOR VEHICLE HAVING A NAVIGATION DEVICE (71) Applicant: AUDI AG, Ingolstadt (DE)

(72) Inventor: Joerg Daniel Hoesterei, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/410,751

(22) PCT Filed: Jun. 19, 2013

(86) PCT No.: PCT/EP2013/001806
§ 371 (c)(1),
(2) Date: Dec. 23, 2014

(87) PCT Pub. No.: WO2013/189595
PCT Pub. Date: Dec. 27, 2013

(65) Prior Publication Data
US 2015/0127204 A1 May 7, 2015

(30) Foreign Application Priority Data

Jun. 23, 2012 (DE) .................. 10 2012 012 567

(51) Int. Cl.
B60L 9/00 (2006.01)
B60L 11/00 (2006.01)
(Continued)

(52) U.S. Cl.
CPC .......... G01C 21/3469 (2013.01); G01C 21/367 (2013.01); G01C 21/3697 (2013.01);
(Continued)

(58) Field of Classification Search
CPC ............ B60L 2250/10; B60L 2250/16; B60L 11/1861; B60L 11/1862; B60L 2260/50; B60L 2260/52; B60L 2260/54; B60L 2240/70; B60L 2240/72; Y02T 10/7291; Y02T 90/163–90/166
See application file for complete search history.

(56) References Cited

U.S. PATENT DOCUMENTS 5,568,390 A 10/1996 Hirota et al.
6,105,138 A * 8/2000 Arakawa .................. G06F 1/263
307/31
(Continued)

FOREIGN PATENT DOCUMENTS

DE 102005020151 11/2006
DE 102008037262 5/2009
(Continued)

OTHER PUBLICATIONS

"Spezielles Carminat TOMTOM Z.E. LIVE lotst Elektrofahrzeuge," Renault, Oct. 2011, 1 page.
(Continued)

Primary Examiner — Jerrah Edwards
Assistant Examiner — Tommy Worden
(74) Attorney, Agent, or Firm — Staas & Halsey LLP (57) ABSTRACT A navigation device has an evaluation unit for determining a maximal range, which can be traveled in the current driving operation mode with an amount of energy stored in an energy storage device of the motor vehicle, and a display unit for displaying a road map, on which a border of an action field delimited by the determined at least one maximum range is presented. A range indicator can be adapted with low expenditure to different types of road maps. On the basis of the graphic data of the road map to be indicated, a graphic processing unit produces a representation of the road map with a region that is offset in terms of height in relation to a map plane. An extension of a border of the region that is offset in terms of height corresponds to the extension of the border of the action field.

20 Claims, 3 Drawing Sheets (51) Int. Cl.
*G05D 1/00* (2006.01)
*G05D 3/00* (2006.01)
*G06F 7/00* (2006.01)
*G06F 17/00* (2006.01)
*G01C 21/34* (2006.01)
*G01C 21/36* (2006.01)

(52) U.S. Cl.
CPC ........ *B60L2240/622* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | |
|---|---|---|---|
| 8,370,058 B2 | 2/2013 | Waeller et al. | |
| 2002/0038181 A1* | 3/2002 | Okude | G01C 21/32 701/458 |
| 2004/0066316 A1* | 4/2004 | Ogawa | G01C 21/32 340/995.1 |
| 2010/0049389 A1* | 2/2010 | Ando | B60K 6/445 701/22 |
| 2010/0317484 A1* | 12/2010 | Gillingham | B60K 1/04 447/7 |
| 2011/0114403 A1* | 5/2011 | Hauger | B60K 6/387 180/65.25 |
| 2011/0217021 A1* | 9/2011 | Dubin | H04N 7/15 386/278 |
| 2011/0298640 A1* | 12/2011 | Tate, Jr. | B60L 3/12 340/995.1 |
| 2011/0320117 A1* | 12/2011 | Sempuku | G01C 21/367 701/425 |
| 2012/0158227 A1* | 6/2012 | Tate, Jr. | B60K 6/46 701/22 |
| 2014/0067225 A1* | 3/2014 | Lee | B60W 30/18072 701/93 |
| 2014/0163854 A1* | 6/2014 | Matsumoto | B60L 11/1862 701/123 |

FOREIGN PATENT DOCUMENTS

| | | | |
|---|---|---|---|
| DE | 102008020057 | 10/2009 | |
| DE | 102009034508 | 1/2011 | |
| DE | 102009052853 | 5/2011 | |
| DE | 102012012567.4 | 6/2012 | |
| EP | 0638887 | 2/1995 | |
| EP | 2385349 | 11/2011 | |
| JP | 2011-158765 | * 7/2011 | .......... B60L 11/1862 |
| WO | PCT/EP2013/001806 | 6/2013 | |

OTHER PUBLICATIONS

German Office Action for German Priority Patent Application No. 10 2012 012 567.4, issued Jun. 28, 2013, 7 pages.
English language International Search Report for PCT/EP2013/001806, mailed Sep. 17, 2013, 2 pages.
WIPO English language translation of the Written Opinion for PCT/EP2013/001806, downloaded from WIPO website Dec. 23, 2014, 5 pages.

* cited by examiner

NAVIGATION DEVICE HAVING A RANGE INDICATOR FOR AN ELECTRIC DRIVING OPERATION AND MOTOR VEHICLE HAVING A NAVIGATION DEVICE

CROSS REFERENCE TO RELATED APPLICATIONS

This application is based on and hereby claims priority to International Application No. PCT/EP2013/001806 filed on Jun. 19, 2013 and German Application No. 10 2012 012 567.4 filed on Jun. 23, 2012, the contents of which are hereby incorporated by reference.

BACKGROUND

The invention relates to a navigation device having a range indicator for an electric driving mode of a motor vehicle. The invention also includes a corresponding motor vehicle. The navigation device has an evaluation device for determining a maximum range which it is expected it will still be possible to cover in the current driving mode with a quantity of energy for the electric drive which is stored in an energy storage device of the motor vehicle.

A motor vehicle can comprise a hybrid drive system comprising an internal combustion engine and an electric motor or else a purely electric drive system. In the context of a hybrid traction drive, an electric traction drive is to be understood here as meaning that the electric motor generates the entire driving power or at least part of the driving power. A motor vehicle with a hybrid drive or purely electric drive generally has in the electric driving mode a lower range than a motor vehicle which is driven exclusively by an internal combustion engine and fossil fuel. For this reason, it is very important to make the driver aware of the limited range in the electric driving mode so that the driver adapts his driving behavior and either drives in a low-consumption fashion or heads in good time to a charging station for charging the energy accumulator. In order to ensure this, continuous and as far as possible precise displaying of the section of road which is currently still available and can still be covered with the remaining quantity of energy is necessary.

For this purpose it is known also to represent, on a display device of a navigation device on which a roadmap for the route planning is displayed, an edge of that action area which results from a maximum range, such as it is expected it will still be possible to cover on the basis of the remaining quantity of electrical energy. This edge can have a nonuniform profile in order to inform the driver about the maximum range depending on the section of road. For example, consumption on a freeway may be very much less given an even velocity than travel through an urban area in which the motor vehicle must, for example, be regularly stopped at traffic lights and accelerated again. Furthermore, the consumption can, for example, also depend on the topography of the surroundings, the driving style of the driver and the weather conditions.

The, in certain circumstances, nonuniform edge of the action area has to be clearly discernible on the represented roadmap and must, in particular, be clearly differentiated from the other elements of the road traffic network represented on the roadmap, that is to say for example the freeways and country roads. Otherwise, when a driver is fleetingly considering the display device, he may mistake a line which is intended to represent the edge of the action area for a road, for example. The selection of the color of the line and of the type of line must therefore be matched to the graphics data of the displayed roadmap. A graphics data record is in this context understood as being those data items on the basis of which a specific roadmap for a predefined area is represented and which define a specific assignment of colors and/or textures to the different components of the road traffic network (for example freeways, country roads) and to the geographical information (for example wooded area, built-up area). For example, there are graphics data records for roadmaps which are adapted, on the one hand, to daytime driving and, on the other hand, to nighttime driving. Other examples are a traffic map and a map which is based on satellite images and which can be produced, for example, with image data from the Google-Earth® Internet service. Furthermore, a country scene or an area adjoining the roads can also be represented in different colors depending on the zoom level.

In order then to generate on the basis of such graphics data records a display of such a roadmap on which the edge of the action area is also represented, it is necessary, for example, to match the color of the line representing the edge of the action area to the color palette of the graphics data record. If a new graphics data record is used to represent a specific roadmap, the display device for representing the edge of the action area must also correspondingly be adapted to the new graphics data record.

SUMMARY

One possible object is to provide, in a motor vehicle, a range indicator for an electric driving mode which can be adapted to different types of roadmaps at low cost.

The inventor proposes a navigation device, in the way already described, an evaluation device for determining a maximum electrical range which it is expected it will still be possible to cover with a quantity of energy which is stored in an electrical energy storage device of the motor vehicle. The energy storage device may be, for example, a traction battery or a supply reservoir for an operating medium of a fuel cell. The evaluation device may in the simplest case be a signal input which is configured to receive the data relating to the maximum range from, for example, a control device of the motor vehicle. The evaluation device can, however, also comprise a processor which is configured to determine the maximum range, for example, on the basis of further operating data of the motor vehicle itself. It is possible, in particular, to use an evaluation device which is known per se.

The navigation device also has a display device for displaying a roadmap on which an edge of an action area which is delimited by the maximum determined electrical range is represented. The display device may be, for example, a screen or a head-up display unit by which it is possible to project a display onto a windscreen, for example.

According to the proposal, a graphic processing device is then additionally provided, by which the evaluation device is coupled to the display device. This graphic processing device is configured to receive the data on the profile of the edge of the action area, that is to say on the shape of the action area, from the evaluation device and to generate therefrom and on the basis of graphics data of the roadmap to be displayed, that is to say a specific graphics data record, a representation of the roadmap with a region which is vertically offset with respect to a plane of the roadmap. In other words, the roadmap is not illustrated in a flat fashion but instead there is a vertically offset region which projects beyond the plane of representation of the roadmap or into the plane, that is to say a plateau, a bulge or a depression or a valley. The profile of the edge of this vertically offset region corresponds to the profile of the edge or the end of the action area in this case. In other words, that action area in which the motor vehicle is expected to still be able to move with the remaining quantity of electrical energy is represented as the vertically offset region on the roadmap. Correspondingly, the display device of the navigation device is also configured to display this roadmap with the vertically offset region for the range indicator.

The navigation device has the advantage that there is no need to convert the color coding of the graphics data record or to adapt the contrast of the structures which are represented themselves by the graphics data in order to represent the profile of the edge of the action area in a way which can be clearly recognized on the display device. It is therefore possible additionally to represent the determined edge of the action area independently of the selected type of roadmap (map for daytime driving, night driving or else a representation of satellite images). This is made possible by the specially configured processing device which receives as input parameters the profile data of the edge of the action area and the graphics data record and generates the representation data therefrom.

In the navigation device, there is provision in particular that the determined maximum range is a distance which can still be covered at best with the motor vehicle from the current position if the energy consumption of the motor vehicle does not exceed a predetermined maximum consumption value. Since the energy consumption can only be estimated, this is generally the value which occurs with the most favorable driving style. It is advantageous here if the driver is also warned that the range may be shorter if the driving style is more intensive in terms of consumption or if further electrical components are used. The evaluation device is preferably therefore configured to determine the at least one maximum electrical range under the assumption of a most favorable consumption case in which average consumption of the motor vehicle corresponds to a predetermined first consumption value. As a basis for this, it is possible to use the range which the motor vehicle can cover until the quantity of energy is completely consumed. It is also possible to provide that, instead of complete consumption, the consumption up to a specific residual reserve is used as the basis. In addition, in this context a range for at least one less favorable consumption case is also then determined, in which the average consumption corresponds to a second consumption value which is higher than the first consumption value. This further range is, of course, shorter than the first range for the most favorable consumption case. A warning zone from the quantity of those locations which can only be reached if the average consumption is below the second consumption value is then formed from the resulting difference in the distances. Determining such a warning zone provides the advantage that imponderable factors can be taken into account in the prediction of the energy consumption.

In order to display these imponderable factors to the driver of the motor vehicle in a clearly recognizable fashion so that the driver can correspondingly adapt his driving behavior and his route planning, one development of the navigation device provides that, in the case of the vertically offset region, that partial region that corresponds to the warning zone, that is to say approximately the edge of the depression or of the plateau, has a larger gradient in absolute terms than that partial region which lies in the interior of the belt formed by the warning zone, that is to say the base of the depression or the level of the plateau. This inner region can be reliably reached even in the case of average consumption which is higher than the second consumption value.

Since the navigation device now permits a range indication in a very flexible way on the basis of different graphics data records, one expedient development provides that different graphics data records relating to roadmaps are stored in a memory of the navigation device, and the processing device is configured to select as a function of a control signal one of the graphics data records for generating the representation on the display device. The different graphics data records are, in particular, at least one of the following roadmaps: a roadmap with adapted coloring for night driving, a roadmap with adapted coloring for daytime driving, a roadmap which emphasizes specific types of road through coloring or representationally, or a roadmap which is formed from satellite images or aerial photographs. As already stated, with the navigation device it is easily possible to switch over between the graphics data records without this also requiring adaptation of the mechanism for representation of the action area.

In particular, the navigation device can then also have a receiver device for receiving new unknown graphics data records for roadmaps. For example, the receiver device can comprise a CD Rom disk drive by which storage media with different graphics data records can be read out. The receiver device can also be configured to receive graphics data records from the Internet via a mobile radio link. The navigation device has, of course, the advantage that the representation of the roadmaps which are formed on the basis of the different graphics data records can always be supplemented with a range indicator which can be clearly recognized and easily interpreted by a driver.

With the navigation device it is also easily possible to configure the evaluation device to determine the edge of the action area as a function of the section of road, i.e. even to use as a basis a nonuniform profile of the edge of the action area such as can be determined by determining a plurality of maximum ranges for different routes. The shapeless edge is obtained here, for example, by including the expected traffic volume and/or geographical obstacles (lakes, mountains, etc.).

In order to determine the maximum range and/or the ranges for less favorable consumption cases, one embodiment of the navigation device provides that the evaluation device determines a prediction for energy consumption by the motor vehicle as a function of at least one of the following aspects: a type of road (for example country road or freeway), a topography of the surroundings (for example mountainous country or flat countryside), an observed driving behavior of the driver (for example irregular velocity or steady driving), weather conditions (for example snowfall, rain or dry weather), traffic volume described by current traffic data such as can be determined, for example, via traffic radio or by an Internet connection, an external temperature or a coefficient of friction of the road. The quantity of energy which is available for the actual electric driving mode is limited by an external temperature, in particular when there are electrically operated air conditioning systems and heaters in the motor vehicle. A coefficient of friction of the road can be determined, for example, by an electrical stability system (ESP—electronic stability program) of the motor vehicle itself or of other motor vehicles which are connected to the motor vehicle via, for example, car-to-car communication. Taking into account the abovementioned aspects permits more precise determination of the maximum range values and of the warning zone.

As already stated, the inventor also proposes a motor vehicle which is defined by the fact that it has an embodiment of the navigation device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
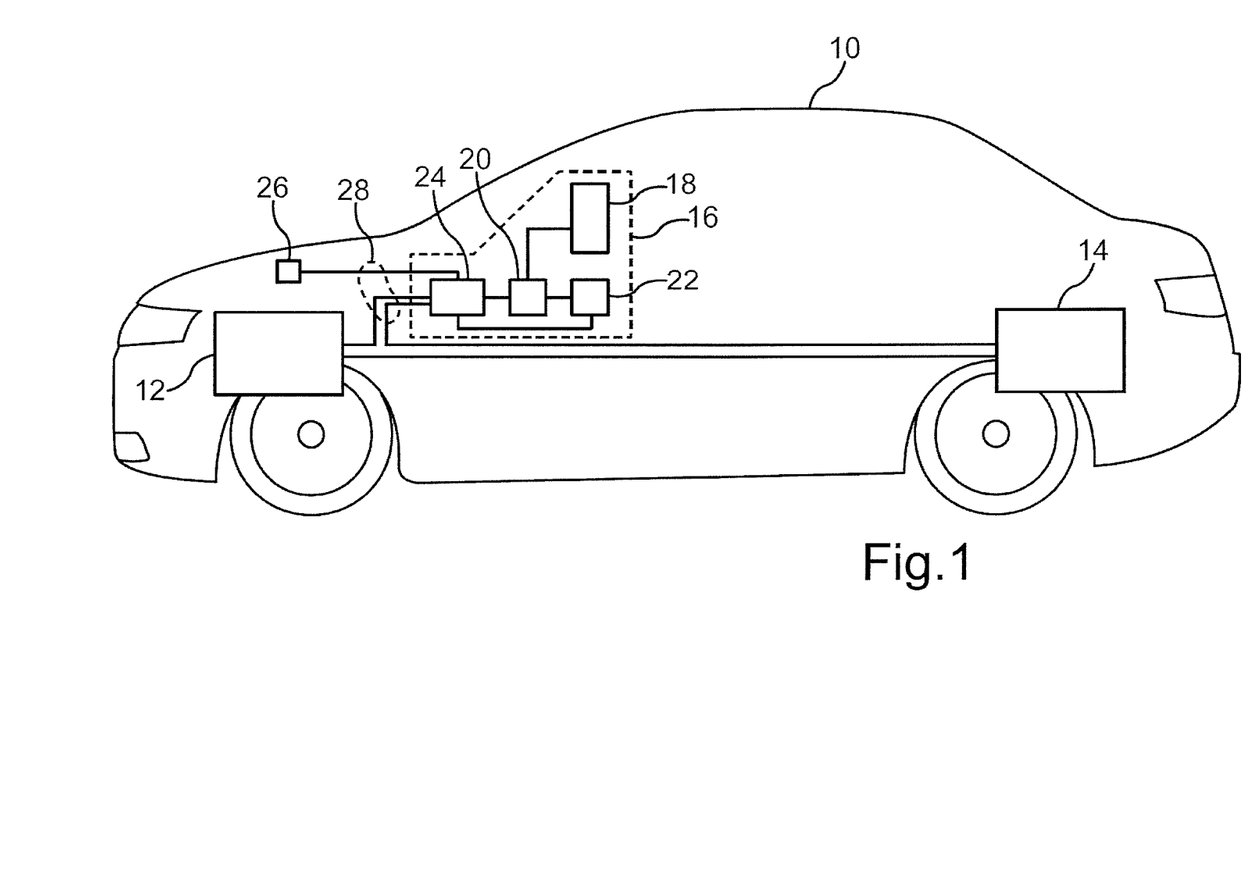
FIG. 1 shows a schematic illustration of an embodiment of the proposed motor vehicle, FIGS. 2-6 each show a range indicator for an electric driving mode of the motor vehicle according to FIG. 1, such as can be generated by a navigation device of the motor vehicle.

FIG. 1 shows a motor vehicle 10 which can be, for example, a passenger car. The motor vehicle 10 can have an electric motor 12 or a plurality of electric motors as a traction drive. In addition, an internal combustion engine can be made available for a hybrid drive. In the example shown, the electric motor 12 is supplied with electrical energy by an energy storage device 14. The energy storage device can be, for example, a traction battery or a fuel cell stack with an associated operating medium reservoir. A navigation device 16 is also made available in the motor vehicle 10. The navigation device 16 comprises a display device 18, for example a screen, a processing device 20 which controls the display device 18, a memory 22 in which graphics data for a plurality of roadmaps are stored, and an evaluation device 24.

A roadmap of the surroundings of the motor vehicle 10 is displayed to a driver (not illustrated) of the motor vehicle 10 on the display device 18 by the navigation device 16. Possible displays which can be represented by the navigation device 16 on the display device 18 are shown by way of example in FIGS. 2 to 6. In addition to the actual road network, information relating to a remaining maximum range is also displayed on the roadmap. The maximum range delimits an action area in which the driver can at least then reach any location with the motor vehicle 10 if he drives to this location directly via the road network using the electric motor 12 as the drive with the quantity of energy remaining in the storage device 14. In order to generate this display, a signal which indicates the current position of the motor vehicle 10 is received by the evaluation device 24 from a position determining device 26, for example a GPS (Global Positioning System) receiver. Furthermore, from the energy storage device 14 the evaluation device 24 receives data relating to the quantity of energy still present in the energy storage device 14. Furthermore, the evaluation device 24 can, for example, also be coupled to the electric motor 12 in order, for example, to receive from a control device (not illustrated) of the electric motor 12 data relating to current energy consumption of the electric motor 12 or of previous average consumption or of a time profile of an energy consumption value over a predetermined time period. The transmission of data can take place, for example, via a CAN (Controller Area Network) bus 28.

From the received data, the evaluation device determines values for a maximum range, i.e. that distance which it is expected it will still be possible to cover in the current driving mode, i.e. with continuous use of the electric motor 12 for the drive, with the remaining quantity of energy or with a predetermined part thereof. The range takes place here as a function of the section of road, for which purpose the evaluation device receives from the memory 22 data relating to the road traffic network surrounding the motor vehicle 10. In addition, the evaluation device 24 also determines further range values which occur if the average consumption which is used as a basic for determining the maximum electrical range is exceeded.

The evaluation device 24 transmits the data relating to the maximum range determined as a function of the section of road and the data relating to the lower ranges which occur at relatively high average consumption to the processing device 20. The processing device 20 is also coupled to the memory 22 and receives from the memory 22 graphics data relating to the roadmap to be displayed. By the graphics data it is determined, for example, what color is assigned to the respective road types to be displayed and how, for example, a wooded area is to be represented (texture and color). The roadmap which results from the data of the memory 22 is changed by the processing device as a function of the data received by the evaluation device 24, in order to display the roadmap on the display unit 18 in combination with a range indicator. This display comprises a three-dimensional representation of the available electrical range per se. The electrical range is illustrated by a three-dimensional bulge or dent in which the selected map type (3-D or 2-D), the map color (day or night) and the kind of map (standard with entered traffic volume, satellite images) do not have to be changed in terms of color or using contrasts in order to integrate the actual range indicator.

In the text which follows in this respect it is described by way of example, with reference to FIGS. 2 to 6, how different range indicators can be integrated into different types of roadmaps by the navigation device 16.

Figure 2:
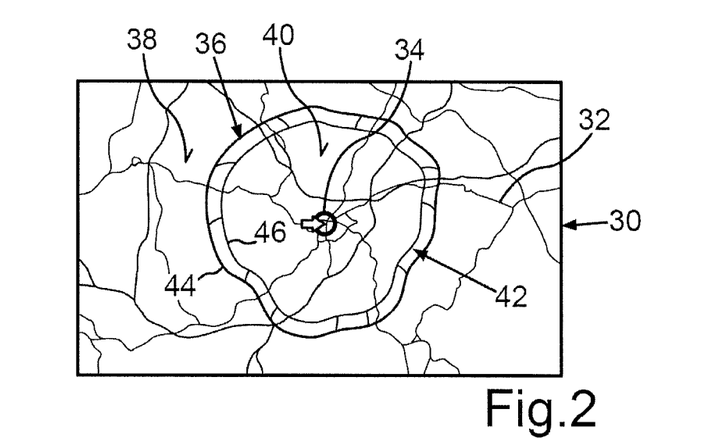

FIG. 2 shows a roadmap 30 which indicates a road traffic network 32 in the surroundings about the current position 34 of the motor vehicle 10. The roadmap 30 is represented with a vertically offset region 36 which rises here as a plateau above a plane 38 of the roadmap 30. The vertically offset region 36 has in the example in FIG. 2 a plateau plane 40 and an edge region 42 which drops away. The width of the edge region 42 corresponds to the width of those zones which can be reached with the motor vehicle 10 starting from the current position 34 only under the condition that the average consumption of energy of the motor vehicle 10 is below a predetermined consumption value. The edge region 42 therefore constitutes a warning zone. In contrast, the map region of the plateau plane 40 displays locations which can also still be traveled to with a relatively high average consumption value (if appropriate on the shortest route via the road network 32). The width of the region 42 which drops away is dependent on the reliability with which the energy consumption can be determined. In order to determine the average consumption, it is possible to take into account, by the evaluation device 24, the type of road via which a respective location can be reached, the altitude differences which have to be overcome, how the driver drives the motor vehicle 10, what traffic volume is present on the roads, what weather conditions and what external temperature are present or else the coefficient of friction of individual road sections. In particular, the evaluation device can also be coupled to further electrical consumers of the motor vehicle 10 in order to also detect their energy consumption, which is likewise covered by the energy storage device 14, and to allow it to be included in the evaluation.

An outer edge 44 of the vertically offset region 36 delimits that area in which any location can be driven to in a most favorable consumption case with the motor vehicle 10 with the remaining quantity of energy (or the remaining quantity of energy minus a residual reserve). In other words, the edge 44 can be reached with the motor vehicle 10 only if the average consumption when driving to a location which is on the edge 44 corresponds to a predetermined minimum consumption value. The edge 44 therefore represents the maximum range in the case of complete consumption or in the case of consumption up to the minimum residual reserve. The edge 44 is determined here as a function of the section of road, for which reason it has an irregular profile on the roadmap 30.

An edge 46 of the plateau plane 40 can be determined on the basis of a second average consumption value. By using a plateau as a vertically offset region 36, the advantage is obtained here that in the simplest case the region 42 which drops away can already be determined on the basis of only two average consumption values.

Figure 3:
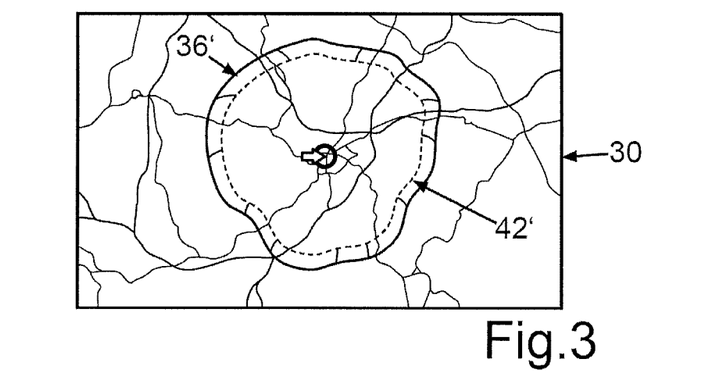

FIG. 3 shows a display of the roadmap 30 in which the range indicator comprises a vertically offset region 36' in the form of a bulge or elevated area with a rounded-off region 42' which drops away. Representing the vertically offset region 36' in the form of a bulge provides the advantage that in the region 42' which drops away more precise information can be provided about the probability of a certain location still being able to be reached with the remaining quantity of energy.

Figure 4:
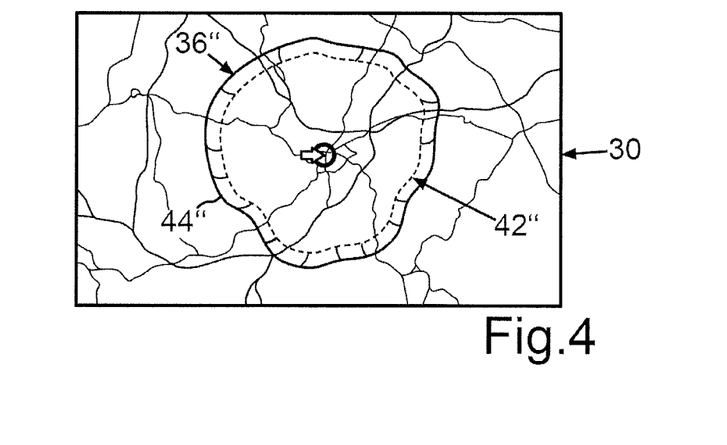

FIG. 4 shows the roadmap 30 for the case in which the range indication is provided by a vertically offset region 36" in the form of a depression or a valley. This representation can be followed intuitively by the driver since he is given the impression that it becomes "more difficult" in a region 42" which drops away to make progress with the motor vehicle 10. This gives him intuitively the impression that the energy supply in the energy storage device is declining in the region 42" which drops away.

Figure 5:
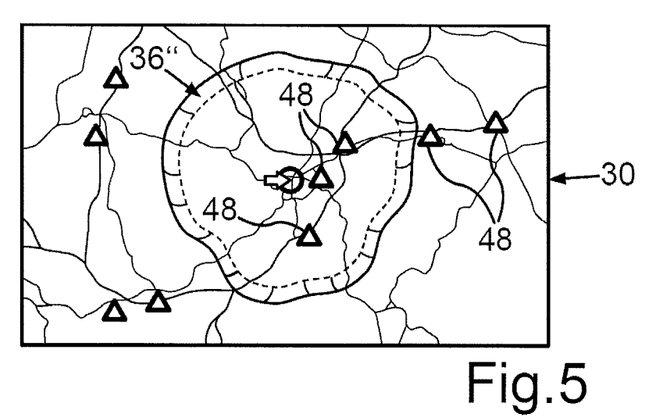

In FIG. 5, the roadmap 30 is represented with the depression as a vertically offset region 36". In addition, information about the traffic volume in the form of symbols 48 is superimposed on the roadmap 30. For the sake of clarity, only a few symbols are provided with a reference sign. Irrespective of the shape and the color of the symbols 48, the range indicator can always be easily recognized by the driver as a result of the vertically offset region 36". This applies, without illustrating this, even in other embodiments with a plateau or a bulge.

Figure 6:
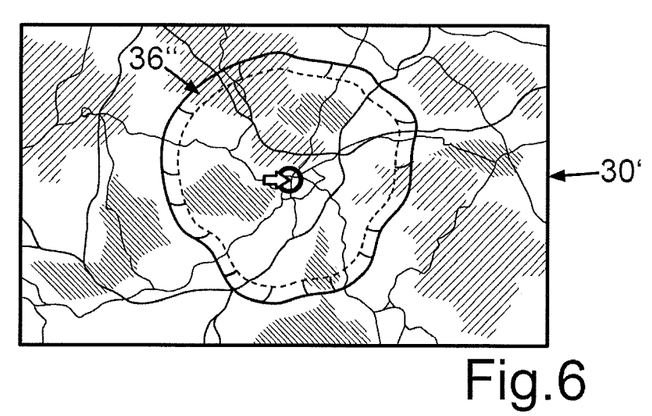

FIG. 6 illustrates a roadmap 30' which is based on another graphics data record which is formed on the basis of, for example, satellite data. The graphics data record for the roadmap 30' can also be stored in the memory 22 and have been selected, for example, by the driver by a corresponding selection menu of an operator control element (not illustrated) of the navigation device 16. In the example in FIG. 6, the range indicator is integrated again into the roadmap 30' by a vertically offset region 36" in the form of the depression. Although a graphics data record which is different than the one in the preceding examples is used (see FIG. 1 to FIG. 5), the driver can still interpret well the same display shape of a depression as a vertically offset region 36" as a range indicator even with the graphics data record for the roadmap 30'. In other words, the range indicator does not have to be adapted to the graphics data record which is used, or conversely the graphics data record does not have to be selected as a function of the range indicator used. It is therefore also possible, for example, to change the graphics data record automatically if the driver is traveling at night and therefore a representation of a roadmap with a richer contrast is favorable, for which representation a corresponding graphics data record can be stored in the memory 22. The range indicator can be retained so that the driver is not confused.

Overall, the example shows that there is no need for any conversion of the previously customary color coding or of the contrast of a roadmap in order to integrate a range indicator into a roadmap. The variant "depression"/"valley" can be interpreted by the driver particularly easily since he is given the impression that with the currently available electrical energy of the vehicle he can travel to the surrounding wall of the valley (region 42" which drops away) but he can never travel beyond the upper edge 44".

The regions 42, 42', 42" which drop away generally indicate to the driver a warning zone in which, as a result of technically related inaccuracies during the prediction of the average consumption, it is not ensured that the driver can reliably reach locations in this region.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A navigation device having a range indicator for an electric driving mode of a motor vehicle, comprising:
   an evaluation device comprising at least one processor to determine a maximum range within which the motor vehicle is expected to be able to travel in a current electric driving mode using remaining energy stored in a storage of the motor vehicle which stores energy to be supplied to the electric motor, the maximum range being defined as an action area delimited by an edge having a profile;
   specially programmed graphics processor coupled to the evaluation device, to receive data on the profile of the edge of the action area and to generate, based on graphics data of a roadmap to be displayed, a representation of the roadmap with the action area, the representation having a vertically offset region which is represented vertically offset with respect to a plane of the action area, the vertically offset region having an edge with a profile that corresponds to the profile of the edge of the action area; and
   a display coupled to the evaluation device via the graphics processor, to display the roadmap on which the edge of the action area is represented with the vertically offset region.

2. The navigation device as claimed in claim 1, wherein the vertically offset region comprises an elevated area or a plateau or a depression.

3. The navigation device as claimed in claim 1, wherein
   the action area is represented as a plateau, and
   the vertically offset region comprises a lower elevation region surrounding the plateau.

4. The navigation device as claimed in claim 1, wherein
   the action area is represented as a valley, and
   the vertically offset region comprises a higher elevation region surrounding the valley.

5. The navigation device as claimed in claim 1, wherein
   the vertically offset region comprises a belt-like circumferential bulge or a depression, and
   the edge of the action area is represented by an inner or outer perimeter of the bulge or depression.

6. The navigation device as claimed in claim 1, wherein
   the evaluation device determines the maximum range assuming a most favorable consumption case,
   the evaluation device determines a less favorable range assuming a less favorable consumption case,
   the maximum range and the less favorable range are determined assuming that the motor vehicle will consume energy stored in the storage at first and second average consumption rates, respectively, until the storage is completely depleted or until the storage is depleted except for a predetermined energy reserve, the second consumption rate is higher than the first consumption rate, and a warning zone is determined which can only be reached if the a consumption rate of the energy stored in the storage is below the second consumption rate.

7. The navigation device as claimed in claim 6, wherein the vertically offset region includes the warning zone and an inner region, the inner region is surrounded by the warning zone and is reachable even if the consumption rate of the energy stored in the storage is equal to or greater than the second consumption rate, the inner region includes a first region having a first gradient, the warning zone includes a second region having a second gradient which is larger in absolute terms than the first gradient.

8. The navigation device as claimed in claim 1, wherein the evaluation device determines the maximum range assuming a lower consumption rate, the evaluation device determines a less favorable range assuming a higher consumption rate, the maximum range is defined by a first action area, the less favorable range is defined by a second action area within the first action area such that the second action area is a subset of the first action area, a warning zone which can only be reached if the motor vehicle has a consumption rate between the higher and lower consumption rates is provided between edges of the first and second action areas, the roadmap is displayed with a plateau and a lower elevation region surrounding the plateau, the second action area is represented with the plateau, the warning zone is represented as a sloped region having an elevation that slopes down from the plateau to the lower elevation region, and the first action area has a border represented by a border between the lower elevation region and the sloped region.

9. The navigation device as claimed in claim 1, wherein the evaluation device determines the maximum range assuming a lower consumption rate, the evaluation device determines a less favorable range assuming a higher consumption rate, the maximum range is defined by a first action area, the less favorable range is defined by a second action area within the first action area such that the second action area is a subset of the first action area, a warning zone which can only be reached if the motor vehicle has a consumption rate between the higher and lower consumption rates is provided between edges of the first and second action areas, the roadmap is displayed with a valley and a higher elevation region surrounding the valley, the second action area is represented with the valley, the warning zone is represented as a sloped region having an elevation that slopes up from the valley to the higher elevation region, and the first action area has a border represented by a border between the higher elevation region and the sloped region.

10. The navigation device as claimed in claim 1, wherein the evaluation device determines the maximum range assuming a lower consumption rate, the evaluation device determines a less favorable range assuming a higher consumption rate, the maximum range is defined by a first action area, the less favorable range is defined by a second action area within the first action area such that the second action area is a subset of the first action area, a warning zone which can only be reached if the motor vehicle has a consumption rate between the higher and lower consumption rates is provided between edges of the first and second action areas, the roadmap is displayed with a bulge or a depression surrounding the second action area, the bulge or depression has a width that represents the warning zone, and the bulge or depression has an outer perimeter representing a border of the first action area.

11. The navigation device as claimed in claim 1, wherein the navigation system further comprises a memory to store a plurality of different graphics data records, and the graphics processor selects as a function of a control signal, one of the graphics data records to thereby obtain the graphics data of the roadmap to be displayed, based on which the representation is generated.

12. The navigation device as claimed in claim 11, wherein the plurality of graphics data records include at least one record selected from the group consisting of:

a night time roadmap record having coloring adapted to night driving, a daytime roadmap record having coloring adapted to daytime driving, a road-type roadmap record having coloring or features that represent different types of roads, and an imaged roadmap record formed from satellite images or aerial photographs.

13. The navigation device as claimed in claim 11, wherein the different graphics data records are used to adapt the roadmap to night driving or daytime driving.

14. The navigation device as claimed in claim 11, wherein the different graphics data records are used to adapt the roadmap to satellite images or aerial photographs.

15. The navigation device as claimed in claim 11, further comprising a receiver device to receive the graphics data records.

16. The navigation device as claimed in claim 11, wherein the memory is a removable computer readable storage medium, and the navigation device further comprises a receiver drive device to receive the removable computer readable storage medium.

17. The navigation device as claimed in claim 11, further comprising a wireless receiver device to receive the graphics data records via the internet.

18. The navigation device as claimed in claim 1, wherein the evaluation device determines the edge of the action area as a function of energy consumption on different potential routes extending from a current position origin, and different residual ranges are determined respectively for the different potential routes such that the edge of the action area is non-uniform and irregular.

19. The navigation device as claimed in claim 18, wherein the evaluation device determines the maximum range using a prediction for energy consumption by the motor vehicle, and the energy consumption is predicted as a function of at least one of type of road, topography of surroundings, an observed driving behavior for a driver of the motor vehicle, weather conditions, traffic volume described by current traffic data, external temperature and a road coefficient of friction.

20. A motor vehicle comprising:

an electric motor for an electric driving mode;

a storage to store energy which is supplied to the electric motor;

a navigation device having a range indicator for the electric driving mode of the motor vehicle, the navigation device comprising:

an evaluation device comprising a processor to determine a maximum range within which the motor vehicle is expected to be able to travel in a current electric driving mode using remaining energy stored in the storage, the maximum range being defined as an action area delimited by an edge having a profile;

specially programmed graphics processor coupled to the evaluation device, to receive data on the profile of the edge of the action area and to generate, based on graphics data of a roadmap to be displayed, a representation of the roadmap with the action area, the representation having a vertically offset region which is represented vertically offset with respect to a plane of the action area, the vertically offset region having an edge with a profile that corresponds to the profile of the edge of the action area; and a display coupled to the evaluation device via the graphics processor, to display the roadmap on which the edge of the action area is represented with the vertically offset region.

* * * * *